March 4, 1941.  H. WOHLRAB ET AL  2,234,034

RECORDING OF ELECTRICAL IMPULSES

Filed July 11, 1939

INVENTORS
Hans Wohlrab
& Karl Schwarz

By

Attorney

UNITED STATES PATENT OFFICE 2,234,034

RECORDING OF ELECTRICAL IMPULSES

Hans Wohlrab, Berlin-Tempelhof, and Karl Schwarz, Berlin-Lankwitz, Germany, assignors to Klangfilm G. m. b. H., Berlin, Germany, a corporation of Germany Application July 11, 1939, Serial No. 283,888
In Germany July 30, 1938

15 Claims. (Cl. 179—100.3)

This invention relates to the photographic recording of electrical impulses such as those of audio frequency, and has for its principal object the provisions of an improved apparatus and method of operation whereby the background noise, usually present when the level or volume of the recorded impulses is relatively low, is minimized without any undesired effect on the level of the impulses reproduced from the record.

The invention is in some respects similar to that disclosed by a copending application of Glenn L. Dimmick, Serial No. 265,279, filed March 31, 1939, Patent No. 2,209,053, issued July 23, 1940.

The invention involves a method of recording sound or other electrical impulses in the form of a variable density record the width of which varies in accordance with the volume. In accordance with the invention, the light intensity gradient of the exposure of the record is varied in that there is placed into the light path of the recording organ an optical means which is controlled in accordance with the volume and which controls the steepness of the control characteristic or the light intensity gradient of the recording light beam.

As such a means, there may be utilized for instance an indistinctly projected edge or penumbra mask which is moved in the direction of the optical axis, or a wedge may be used which is rotated about an axis lying in the optical axis. Furthermore, means may be utilized which have a non-linear control characteristic in which case primarily only parts of the characteristic are utilized.

The invention will be better understood from the following description when considered in connection with the accompanying drawing, and its scope will be pointed out in the appended claims.

Referring to the drawing.

Figure 1:
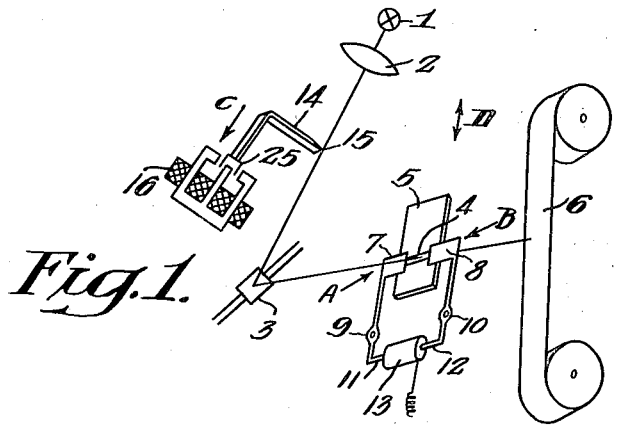
Figure 1 shows an arrangement for practising the method according to the invention by means of an indistinctly projected edge or penumbra mask.

In Figure 1, the light of a source 1 passing through the condenser 2 and arriving at the mirror 3 of the oscillograph is projected upon the light slit 4 of the diaphragm 5 and the image of the slit 4 is reproduced on the photographic film record 6. By means of two diaphragms 7 and 8 movable in the direction of the arrows A and B, the length of the slit 4 is varied. The diaphragms 7 and 8 oscillate about their pivots 9 and 10 and are controlled at their ends 11 and 12, respectively, by a coil 13.

In the light path between the condenser 2 and oscillating mirror 3, a diaphragm or penumbra mask 14 is so arranged that its edge 15 lies in the optical axis. A coil 25 controlled by the magnet 16 operates to move the diaphragm 14 in the direction of the arrow C hence in the direction of the optical axis.

The mirror 3 causes the edge 15 to be indistinctly reproduced on the diaphragm 5. Otherwise stated, the mirror functions to vibrate the penumbra shadow transversely of the slit 4.

In the operation of the system, the mirror 3 is moved in accordance with the sound oscillations. Consequently, the blurred image or penumbra shadow of the edge 15 moves on the diaphragm 5 in the direction of the arrow D hence at right angle to the slit 4. Therefore, the intensity of the illumination of the slit 4 will be varied so that on the film 6 a variable density type of recording will be obtained. The coil 13 as well as the coil of the magnet are supplied with currents which vary in accordance with the volume or level of the impulses being recorded. Thus, by means of the coil 13, the diaphragm or shutters 7 and 8 are moved at small amplitudes in the direction of the arrows A and B whereby the length of the slit 4 will be varied. The variable density record, therefore, will be recorded on the film only in the form of a narrow line when the volumes are low. At the same time, the magnet 16 causes the diaphragm 14 to move in the direction of the arrow C which causes the reproduction of the edge 15 to become more distinct, i. e. measured in the direction laterally to the slit 4, the range of the indistinct image of the edge 15 will be smaller, or as an equivalent thereof, the steepness of the light control characteristic or the light intensity gradient of the penumbra shadow will be greater.

The covering of the slit 4 by the diaphragms 7 and 8 has the advantage that at low volumes, the background noise will be reduced. At the same time, the volume of the recorded impulses tends to be reduced at low volumes. In order to maintain this volume, the characteristic of the light intensity gradient of the penumbra mask is rendered steeper by the movement of the edge 15. In this way, the decrease of the volume effected by the diaphragms 7 and 8 will be eliminated again— it may obviously also be compensated insufficiently or excessively—without the advantage of the reduction of the background noise being thereby lost.

Figure 2:
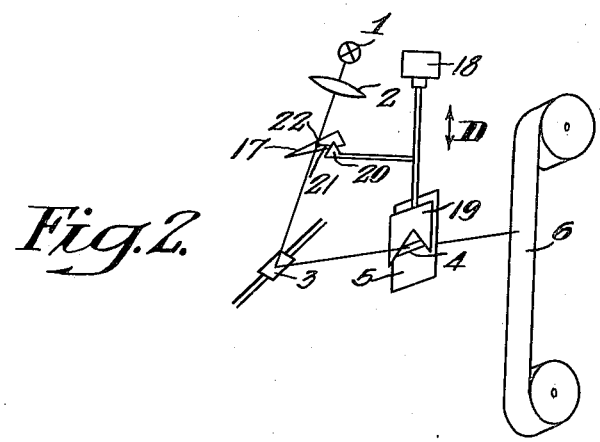
Figure 2 shows a modified arrangement utilizing an optical wedge rotatable about a point in the optical axis.

In Figure 2, the light of the source 1 passes across the condenser 2 and the optical wedge 17 to the mirror 3 and from there across the slit 4 to the film 6. A single magnet 18 actuates the triangular diaphragm 19 in the direction of the arrow D and acts upon the optical wedge 17 through a rod connection 20—21 so that the said optical wedge is turned about its axis 22 which lies in the optical axis. The graduation of the optical wedge 17 is so aligned with the control member 30 that its transparency varies in the linear manner in accordance with the movement of the diaphragm 19 in the direction of the arrow D.

In the operation of the arrangement of Fig. 2, the optical wedge 17 is imaged across the mirror 3 on the diaphragm 5 and the light then passing to the slit 4 is laterally limited by the diaphragm 19. The steepness of the light control characteristic is varied in the same degree by turning the optical wedge 17 as the length of the slit 4 reproduced on the film is determined by the triangular diaphragm 19. Thus the same recording is obtained as in the case of the arrangement of Figure 1.

Figure 3:
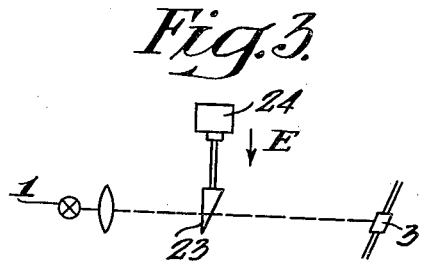
Figure 3 shows another variation which involves a linearly displaced optical wedge.
Figure 4:
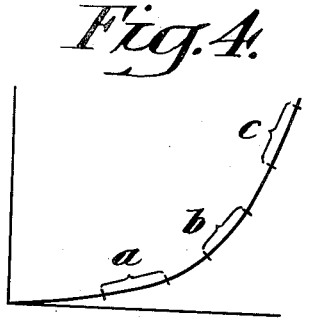
Figure 4 shows the control characteristic of the light of the wedge of Figure 3.

Figure 3 shows only the light path between the source 1 and the oscillating mirror 3. In place of the means shown in Figure 1 and Figure 2, Figure 3 shows an optical wedge 23 moved by means of the magnet 24 in the direction of the arrow E. This wedge is graduated in a non-linear fashion, for instance in accordance with the curve of Figure 4. The steepness of the light control characteristic or the light intensity gradient is attained in Figure 3 by operating on relatively limited parts of the characteristic such as for instance on the parts a, b, or c which can as such be considered as linear.

So far the assumption has been that linear variations are intended, however, the invention can also be used in the case of non-linear variations. The guides of the diaphragms and optical wedges 14, 17, 23 can in this case be readily adapted accordingly. The control of the two control organs 15, 17, 23 on the one hand and that of 7, 8, 19 on the other hand may be such that they compensate each other exactly but in individual cases they may preferably be used in such a manner that an insufficient compensation or excessive compensation will be obtained. The control organs may be joined mechanically as in Figure 2, or they may be mechanically independent as in Figure 1, but electrically connected in that they are placed at the same current source in series or in parallel therewith; also separate current sources may be used.

It is obvious that the invention is not limited to the means as shown. It may also be utilized more especially in other light control apparatus; also the sequence of the light control means may be reversed so that for instance the wedge 17 in Figure 2 lies between the parts 5 and 6.

We claim as our invention:

1. The record producing method which includes vibrating a penumbra shadow transversely of a light slit in accordance with the impulses to be recorded, varying the width of said shadow at said slit in response to change in the volume of said impulses, and varying the height of said shadow in response to change in said volume.

2. The record producing method which includes vibrating a penumbra shadow transversely of a light slit in accordance with the impulses to be recorded, and varying the light intensity gradient of said shadow in response to change in the volume of said impulses.

3. The record producing method which includes vibrating a penumbra shadow transversely of a light slit in accordance with the impulses to be recorded, and varying the height of said shadow inversely as the volume of said impulses.

4. The variable density record producing method which includes varying the width of said record in accordance with the volume of the recorded impulses, and varying the opacity gradient of said record in accordance with said volume.

5. An impulse recording system including a light source, a penumbra mask, means for directing the penumbra shadow of said mask to a strip on which the impulses are to be recorded, and means for shifting said mask along the optical axis of said system to vary the light intensity gradient of said shadow.

6. An impulse recording system including a light source, a penumbra mask, means for directing the penumbra shadow of said mask to a strip on which the impulses are to be recorded, and means responsive to change in the level of said impulses for shifting said mask along the optical axis of said system to vary the light intensity gradient of said shadow.

7. An impulse recording system including a light source, means for directing a light beam from said source to a strip on which the impulses are to be recorded, and means responsive to change in the level of said impulses for varying the light intensity gradient transversely of said beam.

8. An impulse recording system including a light source, means for directing a light beam from said source to a strip on which the impulses are to be recorded, and means including a light wedge rotatable about a point in the optical axis of said system for varying the light intensity gradient transversely of said beam in response to change in the level of said impulses.

9. Sound recording apparatus including a light source, a penumbra mask, means for directing light passing the penumbra mask to a film on which sound is to be recorded, and means for shifting the penumbra mask along the optical axis of the recording system.

10. In combination, a sound recording optical system, a light source, a penumbra mask for determining the intensity of the light transmitted through the recording system, and means for moving the penumbra mask along the axis of the optical system in accordance with the envelope of the sound waves to be recorded.

11. Apparatus of the class described, including a light source, a shutter for defining the length of a line of light, a penumbra vane for determining the intensity of said line of light, and a galvanometer mirror adapted to be vibrated in accordance with sound waves to be recorded for determining variations in the intensity of the line of light.

12. Apparatus of the class described, including a light source, a shutter for defining the length of a line of light, a penumbra vane connected to said shutter for determining the intensity of said line of light, said shutter and vane being operated in accordance with the envelope of sound waves, and a galvanometer mirror adapted to be vibrated in accordance with sound waves to be recorded for determining variations in the intensity of the line of light.

13. Apparatus of the class described, including a light source, a shutter for defining the length of a line of light and a penumbra vane for determining the intensity of said line of light, both operable in accordance with the envelope of sound waves, and a galvanometer mirror adapted to be vibrated in accordance with sound waves to be recorded for determining variations in the intensity of the line of light.

14. The method of varying the amplitude of variation in light intensity in relation to sound amplitude in a penumbra type variable density recording system, comprising the step of shifting the penumbra mask along the axis of the recording system in accordance with the variation required.

15. The method of varying the amplitude of variation in light intensity in relation to sound amplitude in a penumbra type variable density recording system comprising the step of shifting the penumbra mask along the axis of the recording system in accordance with the envelope of the sound waves.

HANS WOHLRAB.
KARL SCHWARZ.